United States Patent [19]

Kelley

[11] 4,077,103

[45] Mar. 7, 1978

[54] PULLING TOOL

[76] Inventor: Eugene M. Kelley, 1796 Larkspur, Pomona, Calif. 91766

[21] Appl. No.: 726,930

[22] Filed: Sep. 27, 1976

[51] Int. Cl.[2] .......... B23P 19/04

[52] U.S. Cl. .......... 29/259; 29/261

[58] Field of Search .......... 29/258-262

[56] References Cited

U.S. PATENT DOCUMENTS

| | | | |
|---|---|---|---|
| 1,328,663 | 1/1920 | Frisz et al. | 29/258 |
| 1,461,312 | 7/1923 | Hayward | 29/259 |
| 1,578,174 | 3/1926 | Robinson et al. | 29/258 |
| 3,986,242 | 10/1976 | Kerr | 29/261 |

*Primary Examiner*—James L. Jones, Jr.
*Attorney, Agent, or Firm*—Boniard I. Brown

[57] ABSTRACT

A pulling tool for removing from a shaft either a rotor, such as a squirrel cage blower rotor, having an axially projecting hub, or a fan having radially projecting blades spaced about and joined at their inner ends to a hub. The tool has a screw for seating against one end of the shaft and a nut threaded on the screw including gripping means for engaging the hub of a rotor on the shaft or behind a fan on the shaft in such a way that the rotor or fan is pulled from the shaft by threading the screw against the shaft.

6 Claims, 9 Drawing Figures

PULLING TOOL

BACKGROUND OF THE INVENTION

1. Field of the Invention

This invention relates generally to pulling tools and more particularly to a pulling tool for removing a rotor, such as a squirrel cage blower rotor, or a bladed fan from a shaft.

2. Discussion of the Prior Art

Many servicing and repair operations require removal from a shaft a rotor, fan or the like having a hub snugly fitted on the shaft. After a period of use, the rotor or other part to be removed often becomes fast on the shaft and hence extremely difficult to remove.

SUMMARY OF THE INVENTION

This invention provides a pulling tool for removing from a shaft either a rotor, such as a squirrel cage blower rotor, having an axially projecting hub or a fan having radially projecting blades spaced circumferentially about and joined at their inner ends to a hub.

The pulling tool of the invention has a screw with means at one end for seating against one end of the shaft with the screw axially aligned with the shaft. Threaded on the shaft is a nut mounting hub gripping means. The hub gripping means is designed to grip the axially projecting hub of a rotor on the shaft. The fan gripping means is designed for hooking engagement behind the fan through the spaces between the adjacent fan blades. In each case, threading of the screw against the shaft causes the gripping means to exert on the rotor or fan, as the case may be, a pulling force for pulling the same from the shaft.

The hub gripping means of the described tools comprises a skirt on the nut about the shaft engaging and of the tool screw for surrounding the rotor hub and screws threaded radially in the skirt for gripping the hub. The fan gripping means of these tools comprises hook-like fingers on the nut for hooking engagement behind the fan, that is behind the inner fan blade ends or the fan hub, through the spaces between the adjacent blades.

In certain described embodiments, these fingers are pivotally mounted on the hub gripping skirt of the tool for rotation between extended fan engaging positions and retracted positions in which the fingers are releasibly retained by spring clips or the like. In another described embodiment, the fan engaging fingers form part of a finger assembly or adapter which is releasably joined to the tool skirt for removal when the tool is to be used to remove a rotor. The fingers of this adapter may be adjustable for engagement with a variety of fan blade arrangements. The adapter is designed primarily for removing high pitched blade fans.

DESCRIPTION OF THE PREFERRED EMBODIMENT

Figure 4:
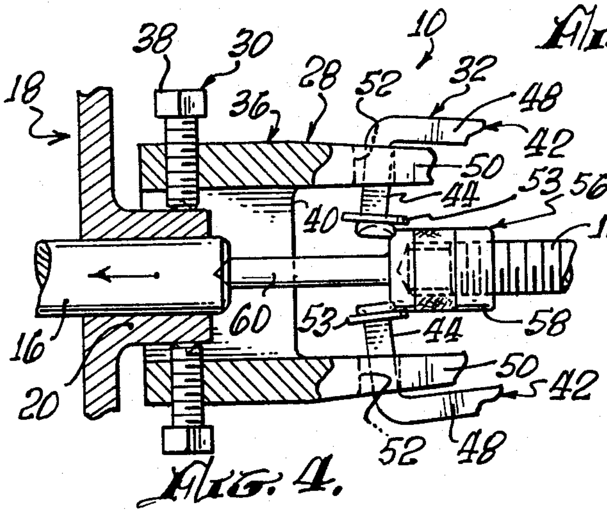
FIG. 4 is a view similar to FIG. 3 showing the tool equipped with a shaft engaging adapter.
Figure 5:
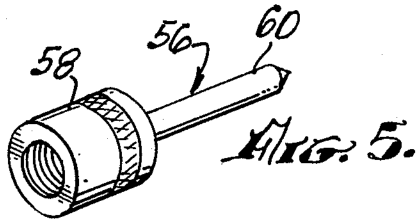
FIG. 5 is a perspective view of the adapter.
Figure 6:
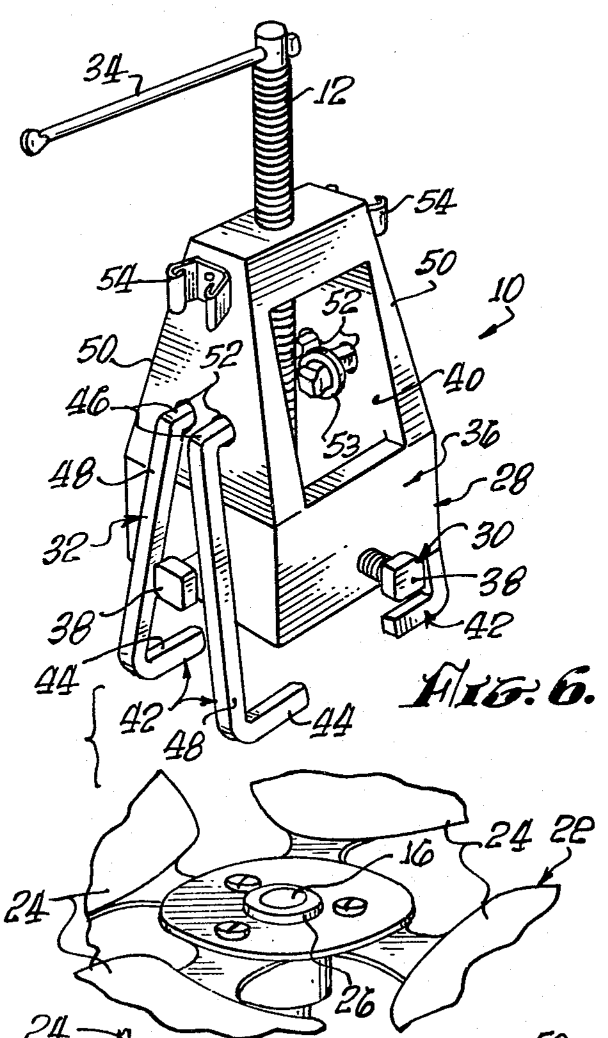
FIG. 6 shows the tool of FIGS. 1-4 set for removing a fan from a shaft.
Figure 7:
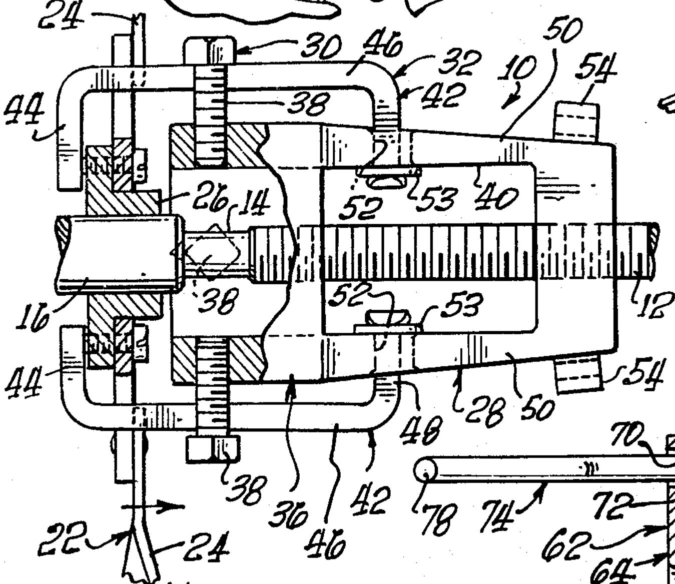
FIG. 7 shows the tool engaged with the fan.

Referring first to FIGS. 1-7, the illustrated pulling tool 10 comprises a screw 12 having means 14 at one end for seating against the end of a shaft 16 mounting a part to be removed. In FIGS. 1-4, this part is a rotor 18, such as a squirrel cage blower rotor or cage, having an axially projecting hub 20. In FIGS. 6 and 7, the part to be removed from the shaft 16 is a fan 22 having radially projecting blades 24 spaced circumferentially about and joined at their inner ends to a hub 26.

Threaded on the screw 12 is a nut 28 having hub gripping means 30 and fan gripping means 32. When the tool 10 is used to remove a rotor 18 from the shaft 16 as in FIGS. 1-4, the hub gripping means 30 of the tool grips the rotor hub 20 in a manner such that when the screw 12 is threaded against the shaft, the rotor is pulled from the shaft. When the tool is used to remove a fan 22 from the shaft 16 as in FIGS. 6 and 7, the fan gripping means 32 are disposed in hooking engagement behind the fan through the spaces between the fan blades 24 in such a way that the fan is pulled from the shaft when the screw 12 is threaded against the shaft.

Referring in more detail to the drawings, the screw 12 mounts a transverse bar 34 at its rear end by which the screw may be turned. At the opposite front end of the screw, is a tip with a projecting coxial conical point which forms the shaft engaging means 14 of the screw.

The rotor hub gripping means 30 on the nut 28 comprises a forwardly projecting, generally annular and in this instance rectangular skirt 36 about the forward end of the screw 12. Threaded radially through the four sides of shirt 36, adjacent its front end, are bolts 38, as shown, skirt 36 has two lateral openings 40 at its rear end adjacent the nut 28 proper.

The fan gripping means 32 of the tool comprise a plurality, in this instance four, hook-like fingers 42. Each finger is fashioned from a metal rod which is bent into a U-shape as shown to provide the finger with generally parallel ends 44 and 46 and a connecting portion 48. The fingers 42 are arranged in pairs at the rear end of the skirt 36, opposite the skirt sides 50 between its rear openings 40. The finger ends 44 extend loosely through holes 52 in the skirt sides 50 to pivotally support the fingers 42 on the skirt 36 for rotation between their retracted positions of FIGS. 1-4 and their extended positions of FIGS. 6 and 7. The finger ends 44 are retained in the skirt holes 52 by washers 53 in these ends.

In their retracted positions, the fingers 42 extend rearwardly along and beyond the rear end of the nut 28 and skirt 36. Spring clips 54 on the skirt sides 50 receive and retain the fingers in these retracted positions. In their extended positions, the fingers extend forwardly along and beyond the front end of the skirt 36.

Figure 1:
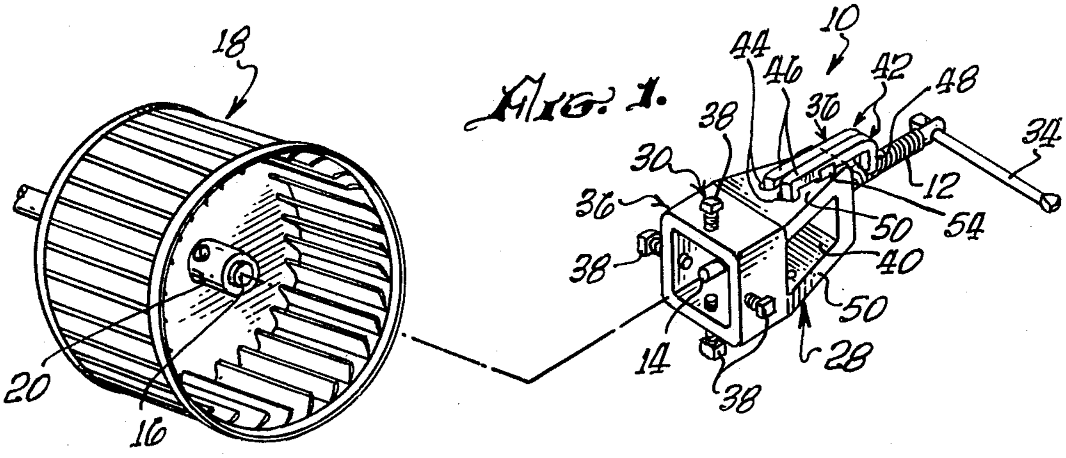
FIG. 1 is a perspective view of a pulling tool according to the invention and a squirrel cage blower rotor to be removed from a shaft by the tool.
Figure 2:
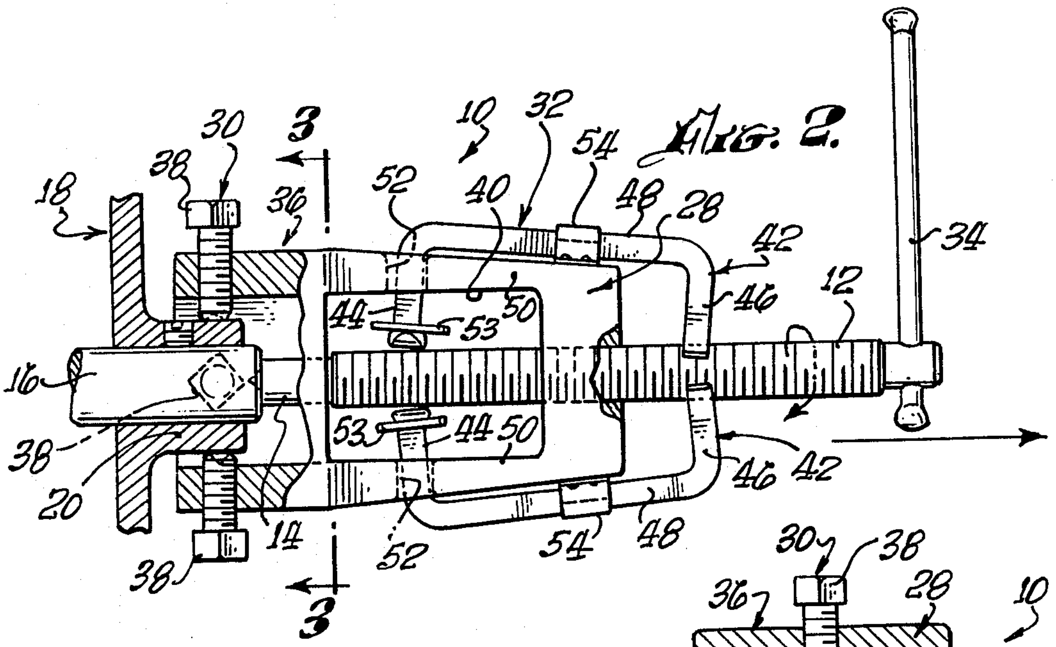
FIG. 2 is an enlarged section through the tool in pulling engagement with the rotor.
Figure 3:
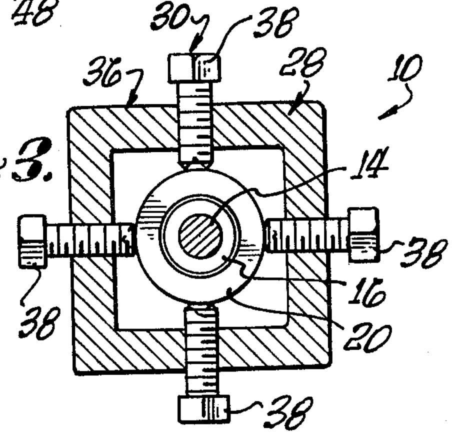
FIG. 3 is a section taken on line 3—3 in FIG. 2.

When the pulling tool 10 is used to remove a rotor 18 from the shaft 16, the tool fingers 42 are retracted and the front end of the skirt 36 is placed over the rotor hub 20, as shown in FIGS. 2-4. The skirt bolts 38 are tightened against the hub 20 to secure the skirt 36 to the hub, making certain the screw 12 is aligned with shaft 16. The screw 12 is then threaded against the shaft 16 to pull the rotor 18 from the shaft or force the shaft from the rotor. The front point 14 on the screw 12 preferably engages in a centering recess in the shaft 12 to retain the screw and shaft in alignment. This recess may already be in the shaft, or may be formed in the shaft with a center punch, or may be formed by the screw point 14 itself.

In some cases, it may be desirable or necessary to use a reduced extension point 56 on the tool screw 12, as shown in FIGS. 4 and 5. This extension has a rear socket 58 which is sized to fit over the front end of the screw 12 and a front stem 60 for engagement with the shaft 16. Extension 56 may be used when the screw 12 is larger in diameter than the shaft 16 or to increase the axial travel of the screw 12 when the rotor hub 20 is relatively long.

When the pulling tool 10 is used to remove a fan 22 from the shaft 16, the tool fingers 42 are extended for engagement behind the fan through the spaces between the fan blades 24, as shown in FIGS. 6 and 7. In FIG. 7, the fingers 42 hook behind the fan hub 26. The tool screw 12 is then threaded against the shaft 16 to pull the fan from the shaft.

Figure 8:
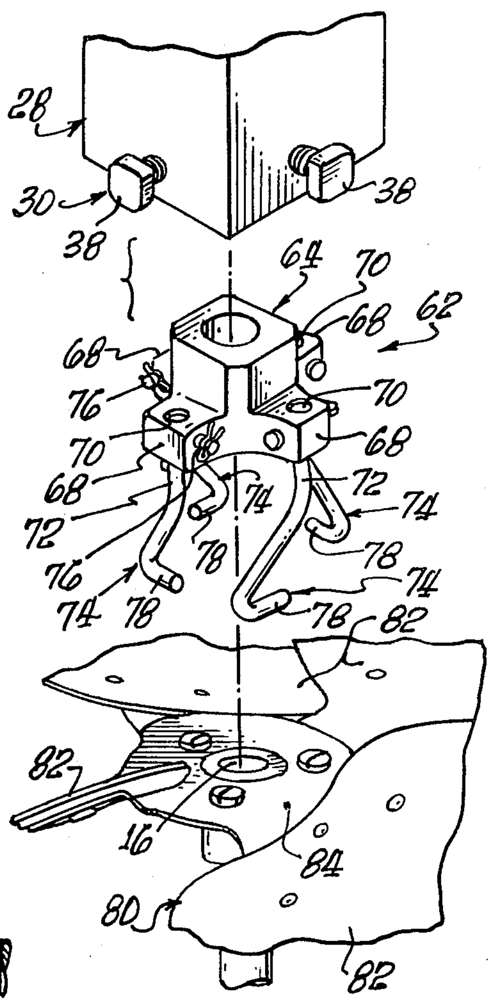
FIG. 8 is an exploded view of a modified tool according to the invention.
Figure 9:
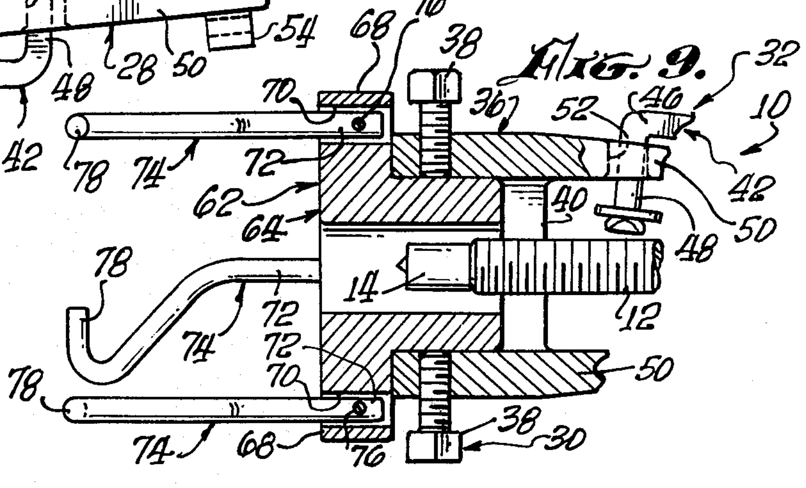
FIG. 9 is a longitudinal section through the assembled tool in FIG. 8.

FIGS. 8 and 9 illustrate a finger assembly 62 for the pulling tool. In this case, the tool includes a basic rotor pulling tool structure 10 which is identical to the tool described above.

Finger assembly 62 comprises an annular collar 64 which is sized and shaped to fit snugly but removably in the front end of the tool skirt 36 and to be secured in position by the skirt bolts 38. The collar has central opening 66 for the tool screw 12. At the front end of the collar 64 are lateral bosses or flanges 68 having bores 70 parallel to the opening 66 for receiving the rear ends or shanks 72 of hook-like fingers 74. The finger shanks 72 are retained in the bores 70 by set screws 76. The front ends 78 of the fingers 74 are turned laterally to form hooks. The set screws 76 permit removal and replacement of the fingers 74 from the collar 64, axial adjustment of the fingers relative to the collar, and rotational adjustment of the fingers about the longitudinal axes of their rear shanks 72. This rotational adjustment permits generally tangential positioning of the front finger ends 78, as shown in FIGS. 8 and 9 or radial positioning of these ends.

The finger assembly 62 provides an adapter for adapting the pulling tool to removing fans 80 with high pitched blades 82. In this case, the fingers 74 may be adjusted to engage or hook behind the inner root ends of the fan blades 82 through the spaces between the blades or, if the fan shape permits, behind the fan hub 84 in somewhat the same manner as the tool in FIG. 7.

I claim:

1. A pulling tool for removing from a shaft a rotor having an axially projecting hub or a fan having radially projecting blades spaced circumferentially about and joined at their inner ends to a hub, comprising:

a screw having a front end for seating against one end of said shaft with the screw substantially coaxially aligned with the shaft, a nut threaded on said screw, rotor gripping means comprising an axially projecting skirt on said nut about said front screw end for surrounding an axially projecting hub of a rotor on said shaft, and bolts threaded radially in said skirt for gripping said rotor hub, and fan gripping means on said nut for engagement with a fan on said shaft comprising hook-like fingers for hooking engagement behind a fan on said shaft through the spaces between the adjacent fan blades and means mounting said fingers on said nut for movement to extended positions wherein said fingers project forwardly of said skirt for engagement with a fan on said shaft and to retracted positions wherein said fingers clear said skirt for surrounding a hub on said shaft, and means for releasibly retaining said fingers in retracted position.

2. A pulling tool for removing from a shaft a rotor having an axially projecting hub or a fan having radially projecting blades spaced circumferentially about and joined at their inner ends to a hub, comprising:

a screw having means at one end for seating against one end of said shaft with the screw substantially coaxially aligned with the shaft, a nut threaded on said screw, rotor gripping means on said nut for gripping engagement with said axially projecting hub or rotor on said shaft, fan gripping means on said nut for engagement with a fan on said shaft, said fan gripping means comprising hook-like fingers on said nut for hooking engagement behind a fan on said shaft through the spaces between the adjacent fan blades, said fan gripping means including means mounting said fingers on said nut for extension to and retraction from fan engaging positions, and means for releasibly retaining said fingers in retracted position, and said finger mounting means pivotally supporting said fingers on said nut for rotation between their extended and retracted positions and said retaining means comprising spring clips for said fingers.

3. A tool according to claim 2, wherein:

said rotor gripping means comprises an axially projecting skirt on said nut about said one screw end for surrounding said axially projecting hub of a rotor on said shaft, and bolts threaded radially in said skirt for gripping said rotor hub; and said fingers are pivotally mounted on said skirt for rotation between their extended and retracted positions and project axially beyond said skirt in their extended fan engaging positions.

4. A tool according to claim 3, wherein:

said fingers are generally U-shaped and disposed externally of said skirt with one end of the fingers extending rotatably through said skirt to rotatably support the fingers on the skirt for rotatable extension and retraction of the fingers and having opposite ends for engagement behind the fan.

5. A pulling tool for removing from a shaft a rotor having an axially projecting hub or a fan having radially projecting blades spaced circumferentially about and joined at their inner ends to a hub, comprising:

a screw having means at one end for seating against one end of said shaft with the screw substantially coaxially aligned with the shaft, a nut threaded on said screw, rotor gripping means on said nut for gripping engagement with said axially projecting hub or rotor on said shaft, fan gripping means on said nut for engagement with a fan on said shaft, said rotor gripping means comprising an axially projecting skirt on said nut about said one screw end for surrounding said axially projecting hub of a rotor on said shaft, and bolts threaded radially in said skirt for gripping said rotor hub, and said fan gripping means comprising a finger assembly including an annular collar removably coaxially positioned in said skirt and releasibly retained in the skirt by said hub gripping bolts, and hook-like fingers secured to and projecting from said collar for hooking engagement behind a fan on said shaft through the spaces between the adjacent fan blades.

6. A tool according to claim 5, including:

means for adjusting each finger relative to said collar about and along an axis parallel to said screw.

* * * * *